United States Patent
Tenny (10) Patent No.: US 12,061,279 B2
(45) Date of Patent: Aug. 13, 2024

(54) OBSERVED TIME DIFFERENCE OF ARRIVAL (OTDOA) POSITIONING IN WIRELESS COMMUNICATION NETWORKS

(71) Applicant: Futurewei Technologies, Inc., Plano, TX (US)

(72) Inventor: Nathan Edward Tenny, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 17/724,148

(22) Filed: Apr. 19, 2022

(65) Prior Publication Data

US 2022/0236361 A1    Jul. 28, 2022

Related U.S. Application Data

(63) Continuation of application No. 15/721,051, filed on Sep. 29, 2017, now Pat. No. 11,320,511.

(51) Int. Cl.
G01S 5/00 (2006.01)
G01S 5/02 (2010.01)
G01S 5/10 (2006.01)

(52) U.S. Cl.
CPC .......... *G01S 5/0045* (2013.01); *G01S 5/0236* (2013.01); *G01S 5/10* (2013.01)

(58) Field of Classification Search
CPC ........ G01S 5/0045; G01S 5/0236; G01S 5/10; H04L 5/0048; H04L 5/0053; H04W 24/10;

(Continued)

(56) References Cited

U.S. PATENT DOCUMENTS

2010/0317343 A1   12/2010  Krishnamurthy et al.
2010/0322169 A1   12/2010  Narasimha
(Continued)

FOREIGN PATENT DOCUMENTS

CN      102907134 A    1/2013
CN      103004267 A    3/2013
(Continued)

OTHER PUBLICATIONS

3GPP TS 36.355 V14.3.0, 3rd Generation Partnership Project; Technical Specification Group Radio Access Network; Evolved Universal Terrestrial Radio Access (E-UTRA); LTE Positioning Protocol (LPP) (Release 14), Sep. 2017, 168 pages.

(Continued)

*Primary Examiner* — Dinh Nguyen
(74) *Attorney, Agent, or Firm* — Slater Matsil, LLP (57) ABSTRACT

Aspects of the disclosure provide a method for observed time difference of arrival (OTDOA) positioning. The method can include receiving from a serving cell of a first network assistance data for measuring time difference of arrival of positioning reference signals (PRSs) received from a plurality of neighboring cells of a second network, receiving from the serving cell a gap pattern for decoding a master information block (MIB) of a first neighboring cell of the plurality of neighboring cells, or a system frame number (SFN) offset of the first neighboring cell, and determining an SFN timing of the first neighboring cell based on the gap pattern for decoding the MIB of the first neighboring cell or the SFN offset of the first neighboring cell.

22 Claims, 6 Drawing Sheets

(58) Field of Classification Search
CPC ..... H04W 48/12; H04W 88/06; H04W 64/00; H04W 4/023
See application file for complete search history.

(56) References Cited

U.S. PATENT DOCUMENTS

| | | |
|---|---|---|
| 2012/0040674 A1 | 2/2012 | McGilly et al. |
| 2012/0088516 A1 | 4/2012 | Ji et al. |
| 2012/0190373 A1* | 7/2012 | Tenny ................ H04W 56/0015 455/447 |
| 2012/0252487 A1 | 10/2012 | Siomina et al. |
| 2013/0028126 A1 | 1/2013 | Kazmi |
| 2013/0122930 A1 | 5/2013 | Woo et al. |
| 2014/0094188 A1 | 4/2014 | Kazmi et al. |
| 2014/0254412 A1 | 9/2014 | Siomina |
| 2014/0293971 A1* | 10/2014 | Yoo ...................... H04W 72/54 370/336 |
| 2014/0369190 A1 | 12/2014 | Chan et al. |
| 2015/0018010 A1 | 1/2015 | Fischer |
| 2015/0141048 A1 | 5/2015 | Woo et al. |
| 2015/0271864 A1* | 9/2015 | Nigam ................. H04W 48/16 370/252 |
| 2015/0312776 A1 | 10/2015 | Cui et al. |
| 2016/0029434 A1 | 1/2016 | Qiu et al. |
| 2016/0205651 A1 | 7/2016 | Isa et al. |
| 2017/0201961 A1* | 7/2017 | Siomina ................ H04W 64/00 |
| 2017/0332192 A1 | 11/2017 | Edge |
| 2018/0249463 A1 | 8/2018 | Huang et al. |
| 2019/0037338 A1* | 1/2019 | Edge ...................... H04W 4/02 |

FOREIGN PATENT DOCUMENTS

| | | |
|---|---|---|
| CN | 106912101 A | 6/2017 |
| EP | 3437395 B1 | 5/2020 |
| WO | 2010144765 A1 | 12/2010 |
| WO | 2015006046 A2 | 1/2015 |

OTHER PUBLICATIONS

Huawei, et al., "Protocol impacts of positioning in NR," 3GPP TSG-RAN WG2 #99bis, R2-1710538, (Revision of R2-1708209), Oct. 9-13, 2017, 4 Pages, Prague, Czech Republic.

Qualcomm Incorporated, "Introduction of PRS based Terrestrial Beacon Systems," 3GPP TSG-RAN WG1 Meeting #83, R1-157062, Nov. 16-20, 2015, 4 pages, Anaheim, CA, USA.

Intel Corporation, "Improvements to OTDOA assistance data signalling," 3GPP TSG-RAN WG2 Meeting #84, Tdoc R2-134282, Nov. 11-15, 2013, 3 pages, San Francisco, USA.

ZTE, "Assistance data for OTDOA," 3GPP TSG RAN WG2 #67bis, R2-095674, Oct. 12-16, 2009, 3 pages, Miyazaki, Japan.

* cited by examiner

OBSERVED TIME DIFFERENCE OF ARRIVAL (OTDOA) POSITIONING IN WIRELESS COMMUNICATION NETWORKS

CROSS-REFERENCE TO RELATED APPLICATIONS

This application is a continuation of U.S. application Ser. No. 15/721,051, filed on Sep. 29, 2017, now U.S. Pat. No. 11,320,511 issued on May 3, 2022, and entitled "Observed Time Difference of Arrival (OTDOA) Positioning in Wireless Communication Networks," which application is hereby incorporated herein by reference.

BACKGROUND

Wireless communication networks can employ various positioning techniques to determine a position of user equipment. For example, Observed Time Difference of Arrival (OTDOA) positioning is a downlink positioning technique specified in Long Term Evolution (LTE) standards developed by the 3rd Generation Partnership Project (3GPP). OTDOA positioning relies on a target device measuring a difference in the time of arrival of Positioning Reference Signals (PRSs) that the target device receives from neighboring base stations.

SUMMARY

According to one aspect of the present disclosure, there is provided a first method for Observed Time Difference of Arrival (OTDOA) positioning. The first method can include receiving from a serving cell of a first network assistance data for measuring a time difference of arrival of Positioning Reference Signals (PRSs) that can be received from a plurality of neighboring cells of a second network. The first method can further include receiving from the serving cell a gap pattern for decoding a Master Information Block (MIB) of a first neighboring cell of the plurality of neighboring cells, or a System Frame Number (SFN) offset of the first neighboring cell, and determining an SFN timing of the first neighboring cell based on the gap pattern for decoding the MIB of the first neighboring cell or the SFN offset of the first neighboring cell. In one example, the assistance data includes at least one of cell identity information of the plurality of neighboring cells, PRS configuration information of the plurality of neighboring cells, and SFN timing information of the plurality of neighboring cells each indicating an offset between a neighboring cell or a reference cell that is one of the plurality of neighboring cells.

Optionally, embodiments of the first method can further include transmitting a decoding request for a measurement gap for decoding the MIB of the first neighboring cell, the decoding request including an identity of the first neighboring cell without specifying a timing of the measurement gap. The gap pattern can include a measurement gap that matches a MIB transmission of the first neighboring cell. Optionally and alternatively, in any of the preceding aspects, the gap pattern can include a measurement gap having a time length longer than a MIB transmission period of the first neighboring cell.

Optionally, in any of the preceding aspects, the first method can further include determining timings of PRS positioning occasions of one or more of the plurality of neighboring cells based on the SFN timing of the first neighboring cell and the assistance data, and transmitting a measurement request for a set of measurement gaps for measuring the PRSs, the measurement request including timings of the set of measurement gaps that match the PRS positioning occasions of the one or more of the plurality of neighboring cells. The first method can further include transmitting measurements of the time difference of arrival of the PRSs obtained by measuring the PRSs during the set of measurement gaps.

According to another aspect of the disclosure, there is provided a second method for OTDOA positioning that can include transmitting by a serving cell of a first network to a User Equipment (UE) assistance data for measuring time difference of arrival of PRSs received from a plurality of neighboring cells of a second network at the UE, and transmitting by the serving cell a first gap pattern for decoding a MIB of a first neighboring cell of the plurality of neighboring cells, or an SFN offset of the first neighboring cell, in order to determine an SFN timing of the first neighboring cell at the UE.

Optionally, embodiments of the second method can further include receiving by the serving cell a decoding request for a measurement gap for decoding the MIB of the first neighboring cell, the decoding request including an identity of the first neighboring cell without specifying a timing of the measurement gap. Optionally, in any of the preceding aspects, the first gap pattern includes a measurement gap that matches a MIB transmission of the first neighboring cell. Optionally and alternatively, in any of the preceding aspects, the first gap pattern includes a measurement gap having a time length longer than a MIB transmission period of the first neighboring cell.

Optionally, in any of the preceding aspects, the second method can further include receiving by the serving cell a measurement request for a set of measurement gaps for measuring the PRSs, the measurement request including timings of the set of measurement gaps that match PRS positioning occasions of one or more of the plurality of neighboring cells, transmitting by the serving cell a second gap pattern including the requested set of measurement gaps in response to receiving the measurement request for the set of measurement gaps, and receiving by the serving cell measurements of the time difference of arrival of the PRSs from the UE. The SFN offset of the first neighboring cell is defined according to a modulus; for example, the SFN offset of the first neighboring cell may be defined modulo 1024.

According to a further aspect of the present disclosure, there is provided a UE for OTDOA positioning. The UE can include a memory storage comprising instructions, and one or more processor in communication with the memory. The one or more processors can execute the instructions to receive from a serving cell of a first network assistance data for measuring time difference of arrival of PRSs received from a plurality of neighboring cells of a second network, receive from the serving cell a gap pattern for decoding a MIB of a first neighboring cell of the plurality of neighboring cells, or an SFN offset of the first neighboring cell, and determine an SFN timing of the first neighboring cell based on the gap pattern for decoding the MIB of the first neighboring cell or the SFN offset of the first neighboring cell.

Optionally, in an embodiment of the UE, the one or more processor can execute the instructions to transmit a decoding request for a measurement gap for decoding the MIB of the first neighboring cell, the decoding request including an identity of the first neighboring cell without specifying a timing of the measurement gap. The gap pattern can include a measurement gap that matches a MIB transmission of the first neighboring cell. Optionally and alternatively, in any of the preceding aspects the gap pattern can include a measurement gap having a time length longer than a MIB transmission period of the first neighboring cell.

Optionally, in any of the preceding aspects, the one or more processor can execute the instructions to determine timings of PRS positioning occasions of one or more of the plurality of neighboring cells based on the SFN timing of the first neighboring cell and the assistance data, and transmit a measurement request for a set of measurement gaps for measuring the PRSs, the measurement request including timings of the set of measurement gaps that match the PRS positioning occasions of the one or more of the plurality of neighboring cells. In any of the preceding aspects, the one or more processor can execute the instructions to transmit measurements of the time difference of arrival of the PRSs obtained by measuring the PRSs during the set of measurement gaps. The first network can be an NR network, and the second network can be an LTE network.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF ILLUSTRATIVE EMBODIMENTS

Aspects of this disclosure describe a system and method for Observed Time Difference of Arrival (OTDOA) positioning in wireless communication networks. More specifically, the disclosure describes techniques for obtaining a System Frame Number (SFN) of a neighboring cell during an OTDOA positioning process to determine a position of a target device. The neighboring cell can be associated with a first wireless network that is configured to support OTDOA positioning, while the target device can be associated with a second wireless network that does not support OTDOA positioning.

During the OTDOA positioning process, a location server can provide the target device with positioning assistance data via the second wireless network. The positioning assistance data can include identification of one or more neighboring cells that belong to the first wireless network and are adjacent to the target device. Further, the assistance data can include positioning reference signal (PRS) timings of each of the neighboring cells that are defined with respect to an SFN timing of the respective neighboring cell, while SFN timings of each neighboring cell can be specified with respect to a reference cell that is a member of the listed neighboring cells. Based on the techniques described herein, an SFN timing of one of the listed neighboring cells can be obtained, and accordingly the timings of the PRSs can be determined. Determining the SFN timing of the reference cell may comprise first determining the SFN timing of a neighboring cell different from the reference cell, followed by inferring, from the SFN timing of the neighboring cell, the SFN timing of the reference cell based on the assistance data.

Figure 1:
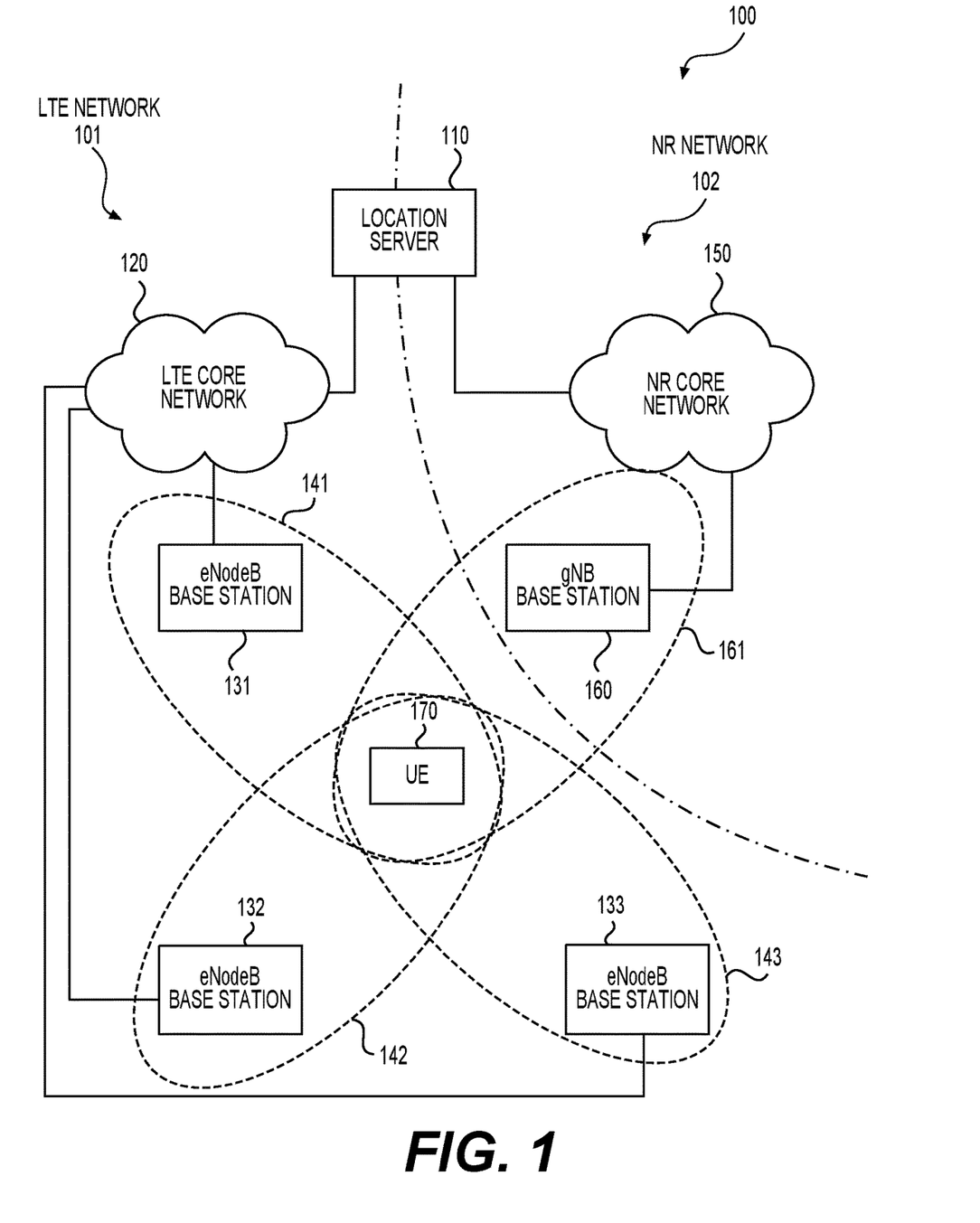
FIG. 1 shows an exemplary communication network that includes a Long Term Evolution (LTE) network and a New Radio (NR) network.

FIG. 1 shows an exemplary communication network 100 that includes a Long Term Evolution (LTE) network 101 and a New Radio (NR) network 102. The LTE network 101 and the NR network 102 coexist in the communication network 100. In one example, the LTE network 101 can include an LTE core network 120 and a plurality of eNodeB base stations, such as eNodeB base stations 131-133, that are connected to the LTE core network 120. The NR network 102 can include an NR core network 150 and a plurality of gNB base stations, such as the gNB base station 160. In addition, the communication network 100 includes a location server 110 that can be connected to the LTE core network 120 and the NR core network 150.

According to this exemplary embodiment, the LTE network 101 can be a network compliant with 3rd Generation Partnership Project (3GPP) LTE standards, while the NR network 102 can be a network compliant with 3GPP NR standards. While the LTE network 101 and the NR network 102 are used as examples in FIG. 1, the present disclosure is not limited to a LTE network and a NR network. The techniques described herein can also be applicable to other types of wireless communication networks that may compliant to other communication standards and coexist with each other.

The location server 110 can be deployed as part of either the LTE core network 120 or the NR core network 150, or can be dependent from the LTE core network 120 and the NR core network 150. However, the location server 110 can be associated to both of the LTE core network 120 and the NR core network 150. In one example, the location server 110 performs functions of an Evolved Serving Mobile Location Center (E-SMLC) as defined in LTE standards, and is deployed in the LTE core network 120. In another example, the location server 110 performs location management functions (LMF) as defined in NR standards as well as functions of an E-SMLC, and is deployed in the NR core network 150.

The eNodeB base stations 131-133 can be base stations implementing an eNodeB node specified in the 3GPP LTE standards, while the gNB base station 160 can be a base station implementing a gNB node specified in the 3GPP NR standards. Each base station 131-133 or 160 can transmit radio signals towards certain directions to cover a geographical area that is referred to as a cell. A cell can be assigned a cell identity by which it can be identified in the wireless communication network 100. In FIG. 1, cells 141-143 are formed by the eNodeB base stations 131-133, respectively, while a cell 161 is formed by the gNB base station 160. Transmission or reception of signals from a base station can be said to be transmission or reception of the signals from a cell associated with the respective base station.

As shown in FIG. 1, the communication network can include user equipment (UE) 170. The UE 170 can be any device capable of wirelessly communicating with the communication network 100, such as a mobile phone, a laptop computer, a vehicle carried device, and the like. In the FIG. 1 example, the UE 170 is able to operate on the LTE network 101, as well as the NR network 102. Accordingly, the UE 170 includes circuits configured to perform signal processing in accordance with the LTE standards and the NR standards. In one example, the NR network 102 and the LTE network 101 are configured to operate on different frequency bands. For example, the gNB base station 160 operates on millimeter wave bands while eNodeB base stations 131-133 operate on frequency bands with lower frequencies. Accordingly, the UE 170 can include a transceiver configured to operate on respective different frequencies.

In the FIG. 1 example, the UE 170 is wirelessly connected to the gNB base station 160. For example, the UE 170 can operate in a connected mode maintaining a radio resource control (RRC) connection between the UE 170 and the gNB base station 160. Alternatively, the UE 170 can operate in an idle mode but monitoring signals transmitted from the gNB base station 160. As shown in FIG. 1, the UE 170 is under the coverage of the cells 141-143 and 161. As the UE 170 is connected to the gNB base station 160 and ready to be served by the gNB 160, the cell 161 is referred to as a serving cell of the UE 170, while the other cells 141-143 are referred to as neighboring cells of the UE 170. Of course, there can be a plurality of neighboring cells that cover the UE 170, but are not shown in FIG. 1.

In one example, the OTDOA positioning, a downlink positioning scheme, is used to locate the UE 170. In OTDOA positioning, a target device measures PRSs from a plurality of cells that may include a serving cell and/or neighboring cells, and determines differences in time of arrival of PRSs between a reference cell and other cells. For example, the serving cell can be used as the reference cell which provides a time baseline for determining the differences in time of arrival of PRSs. This process is referred to as a Reference Signal Time Difference (RSTD) measurement process. The difference between a pair of cells can determine a hyperbola, and intersections of at least two hyperbolae can determine a position of the target device. Positions of base stations of the measured cells can be used for the determination.

In the FIG. 1 example, the LTE network 101 is configured to support the OTDOA positioning, while the NR network 102 does not support the OTDOA positioning. To facilitate the RSTD measurement, the eNodeB base stations 131-133 of the LTE network 101 are configured to transmit PRSs periodically. Transmission of PRSs, referred to as positioning occasions, can be based on a PRS configuration. The PRS configuration specifies when PRS positioning occasions will take place with respect to an SFN of a respective base station transmitting the respective PRSs.

In addition, to facilitate the RSTD measurement, the location server 110 can be configured to provide assistance data to the UE 170, receive RSTD measurements from the UE 170, and accordingly calculate a location of the UE 170. Specifically, in one example, the location server 110 can communicate with the eNodeB base stations 131-133, for example, using LTE Positioning Protocol A (LPPa) specified in 3GPP standards. By exchanging of LPPa messages, the location server 110 can collect information from the eNodeB base stations 131-133. For example, the collected information can include PRS configurations, SFN timing information, frame timing information, cell identifications, antenna coordinates corresponding to neighboring cells 141-143. The location server 110 can further generate assistance data based on the collected data (or information from other sources), and provide the assistance data to the UE 170. In one example, the assistance data is transmitted to the UE 170 using LTE Positioning Protocol (LPP) specified in 3GPP standards. The assistance data can include the PRS configurations, the SFN timing information, the frame timing information, and the cell identities of the neighboring cells 141-143.

Assuming the UE 170 is connected to the eNodeB base station 131, based on the assistance data, the UE 170 can typically determine timings of PRS positioning occasions of the neighboring cells 141-143, and accordingly capture the PRS transmission during the PRS positioning occasions to perform RSTD measurement. For example, in the assistance data, the serving cell 141 can be used as a reference cell, and SFN timings and frame timings of other neighboring cells 142-143 can be specified with respect to this reference cell 141. A frame timing can refer to one of time points when frames are sequentially transmitted. An SFN timing can refer to one of time points when frames having certain SFNs are transmitted. As an example, a frame timing offset of a neighboring cell with respect to the reference cell 141 can be provided in the assistance data, and the corresponding SFN timing information can be provided in a form of an SFN offset with respect to the SFN of the reference cell 141. In an alternative example, frame boundaries of the serving cell 141 and the neighboring cells 142-14 can be synchronized, meaning frame timing offset equals zero. Accordingly, the assistance data may not include frame timing offset information, but includes SFN offset information.

As the UE 170 is assumed to be connected to the eNodeB base station 131, the UE 170 knows SFN timings of its serving cell 141 (frame timings of the serving cell 141 and SFNs of each frame received from the serving cell). Accordingly, the UE 170 may be able to determine frame timings and SFN timings of the neighboring cells 142-143 based on the assistance data.

As described above, in the FIG. 1 example the UE 170 is connected to the NR network 102 that does not support the OTDOA positioning, and therefore the above described OTDOA positioning cannot be readily performed to locate the UE 170. Specifically, the gNB base station 160 may not transmit PRSs due to configuration. In addition, the location server 110 cannot collect information about the serving cell 161 of the UE 170, and consequently does not include the serving cell 161 as one of the cells listed in assistance data for OTDOA measurement. However, the assistance data can still be transmitted to the UE 170 through the NR core network 150 and the gNB base station 160, for example, by using the LPP messages. The transmission of the assistance data can be transparent for the gNB base station 160. For example, the assistance data may be transmitted as signaling of a Non-Access Stratum (NAS) protocol. One of the neighboring cells 141-143 can be used as a reference cell in the assistance data, instead of a serving cell.

According to an aspect of the disclosure, under the above circumstances where the UE 170 is connected to a serving cell that is not included in positioning assistance data, the UE 170 can obtain an SFN timing of at least one of the neighboring cells included in the assistance data. The at least one of the neighboring cells can be a reference cell as specified in the assistance data, or can be a neighboring cell other than the reference cell. In one example, the UE 170 can read a MIB of a neighboring cell to obtain the SFN information. For example, the UE 170 can send a request to the serving cell 161 for a measurement gap, and can decode a MIB of one of the neighboring cells listed in the assistance data during the measurement gap. In another example, the gNB 160 can provide an SFN offset and a frame timing offset of a neighboring cell listed in the assistance data to the UE 170 as a response to a request from the UE 170. As a result, a location of the UE 170 being connected to a network that does not support the OTDOA positioning can be determined.

In various examples, the SFN timing of a neighboring cell can be represented as a combination of a frame timing offset with respect to the serving cell 161 (or in other words, a frame timing difference between the neighboring cell and the serving cell 161) and an SFN of the neighboring cell. Accordingly, obtaining an SFN timing of the neighboring cell is equivalent to obtaining a frame timing offset and an SFN of the neighboring cell. While in FIG. 1 example three neighboring cells 141-143 are listed as neighboring cells in the assistance data, number of neighboring cells listed in assistance data can be more than three, for example, 10, 20 or more than 20 in other examples.

Figure 2:
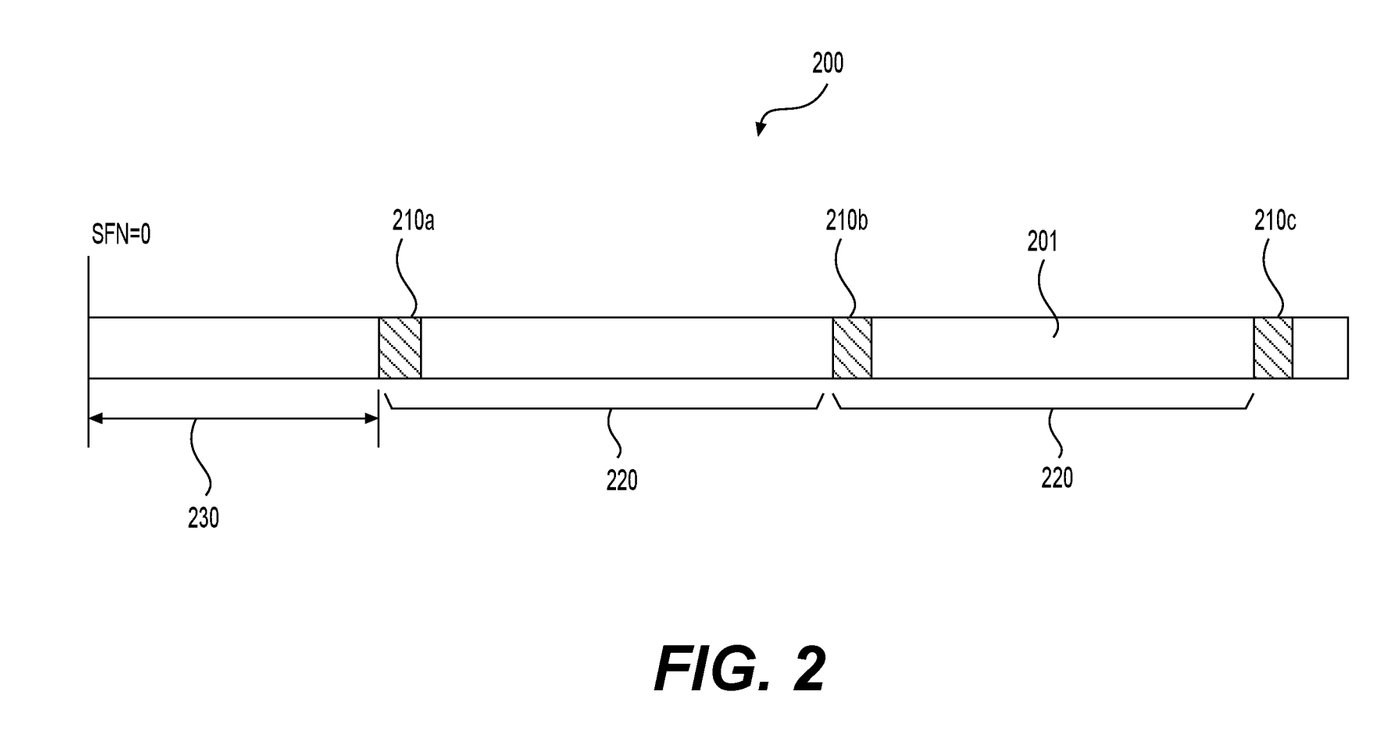
FIG. 2 shows an exemplary Positioning Reference Signal (PRS) configuration according to an embodiment of the disclosure.

FIG. 2 shows an exemplary PRS configuration 200 according to an embodiment of the disclosure. A sequence of sub-frames 201 starting at a first sub-frame of a frame with SFN=0 is shown in FIG. 2. PRS positioning occasions 210*a*-210*c* take place periodically among the sequence of sub-frames 201. The PRS configuration 200 in the time domain can be defined by three parameters. A first parameter 210 is PRS positioning occasion that refers to a number of consecutive sub-frames that carry PRSs. For example, each of the PRS positioning occasions 210*a*, 210*b*, or 210*c* can include 1, 2, 4, or 6 sub-frames. A second parameter 220 is PRS transmission period 220. For example, a PRS transmission period can last for 160, 320, 640, or 1280 sub-frames. A third parameter is PRS sub-frame offset that refers to a number of sub-frames before the first PRS positioning occasion 210*a* since the beginning of the first frame with SFN=0. As shown, when SFN timings of the sequence of sub-frames are known, PRS positioning occasion timings can be determined based on the PRS configuration.

Figure 3:
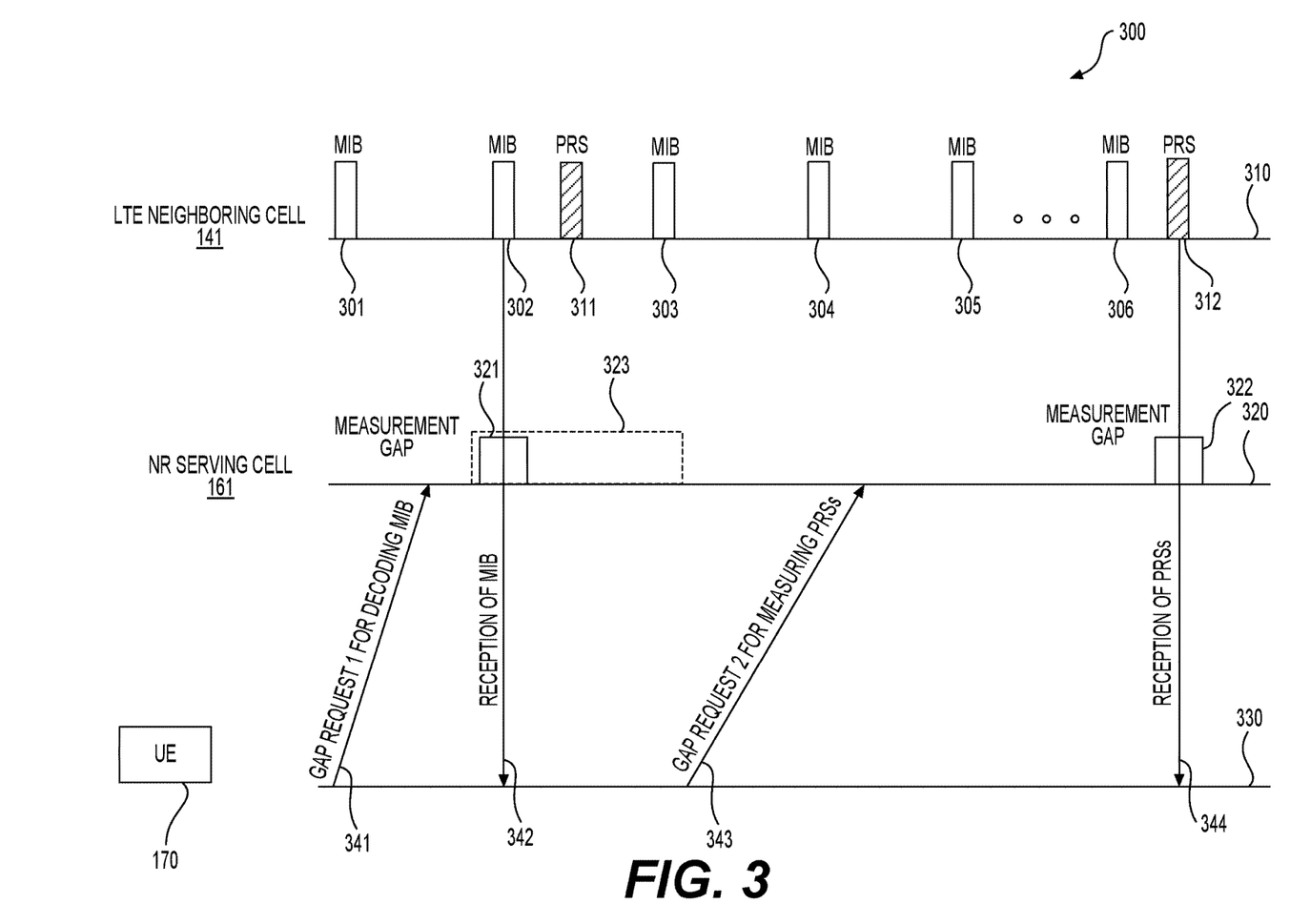
FIG. 3 shows an example Reference Signal Time Difference (RSTD) measurement process according to an embodiment of the disclosure.

FIG. 3 shows an example RSTD measurement process 300 according to an embodiment of the disclosure. During the process 300, an SFN of a neighboring cell is obtained by reading a MIB of the neighboring cell. In the FIG. 3 example, the UE 170 is connected to the NR serving cell 161, and the LTE neighboring cell 141 is used as a reference cell in the assistance data provided by the location server 110. The process 300 can be performed to obtain an SFN of the neighboring cell 141 as well as frame timings of the neighboring cell 141.

Three time lines 310-330 corresponding to the LTE neighboring cell 141, the NR serving cell 161, and the UE 170, respectively, are shown in FIG. 3. The first timeline 310 includes a sequence of sub-frames 301-306 carrying MIBs. Each of the sub-frames 301-306 can be a first sub-frame of one of a sequence of consecutive frames transmitted from the neighboring cell 141. Thus, the MIBs have a transmission period of one frame. Each MIB can carry SFN information, and decoding a MIB can obtain an SFN of a respective frame that carries the MIB. Each sub-frame 301-306 can also carry one or more synchronization sequences transmitted before the SFN information, such as primary synchronization signal (PSS) and secondary synchronization signal (SSS). The UE 170 can accordingly obtain the frame timings of the neighboring cell 141 by reading those synchronization sequences. In addition, the first time line 310 also shows a sequence of PRS positioning occasions 311-312. PRSs of the PRS positioning occasions 311-312 are transmitted from the neighboring cell 141 according to a PRS configuration.

The second time line 320 includes multiple measurement gaps 321-323. A measurement gap refers to a time period configured for performing an inter-frequency measurement. For example, a UE is connected to a serving cell operating on a first carrier frequency, and performs a measurement (such as RSTD measurement) of signals received from a neighboring cell operating on a second carrier frequency. The UE can send a request through an RRC connection to the serving cell for one or more measurement gaps. Optionally, in the request, timings and duration of the measurement gaps can be specified. As a response to the request, the serving cell can configure the measurement gaps for the UE and return a measurement gap pattern. For example, a measurement gap pattern can include one or more measurement gaps that each has a starting time and a time length. During the measurement gaps, no uplink or downlink data transmission is scheduled for the UE. The UE can switch from the serving cell frequency to the neighboring cell frequency to perform an inter-frequency measurement, and subsequently switch back to the serving cell. Duration of a measurement gap can include time for switching between different carrier frequencies, and time for performing the measurement.

In a first example, the serving cell 161 of the NR network 102 knows frame timings of the neighboring cell 141 of the LTE network 101. For example, as part of a configuration of the NR network 102, frame timings of the neighboring cell 141 are provided to the serving cell 161 in a form of frame timing offsets with respect to the serving cell 161. Accordingly, when requesting a measurement gap for reading a MIB of the neighboring cell 141, the UE 170 can specify a purpose of the measurement gap (to read MIB) but without specifying a particular time of the measurement gap. The serving cell 161 knows MIB timings (frame timings) of the neighboring cell 141, and can accordingly schedule a measurement gap 321 that matches a transmission of a MIB, such as the sub-frame 302 in the FIG. 3 example. In one example, the measurement gap 321 lasts for about 2 ms. In alternative examples, the measurement gap 321 can take other lengths.

In a second example, the serving cell 161 does not have knowledge of frame timings of the neighboring cell 141. In this case, a longer measurement gap 323 than the measurement gap 321 can be configured. For example, the measurement gap 323 can have duration suitable for the UE 170 to decode a MIB of the neighboring cell 141 without knowing the frame timings. In one example, the measurement gap 323 has a time length longer than a frame. For example, frames on time line 310 have duration of 10 ms, and the measurement gap 323 is configured to be about 11 ms or longer than 11 ms. Under such configuration, at least one sub-frame carrying a MIB can be captured within the span of the measurement gap 323. In alternative example, more than one measurement gap 321 or 323 can be configured. For example, when the neighboring cell is of low signal quality, decoding MIBs may be tried more than once. The timing of the more than one measurement gap may facilitate receiver behaviors such as combining of different transmission instances of the MIB, for instance, allowing the receiver to overcome bad radio conditions.

The measurement gap 322 can be configured for RSTD measurement. For example, after SFN and frame timing of the neighboring cell 141 are obtained, based on assistance data from the location server 110, the UE 170 can determine timings of PRS positioning occasions of the neighboring cells 141-143. Accordingly, the UE 170 can send a second gap request to the serving cell 161 specifying a gap pattern including one or more measurement gaps matching the PRS positioning occasions of the neighboring cells 141-143.

In one example, the neighboring cells 141-143 operate on a same frequency, and frame timings of the neighboring cells 141-143 are synchronized. In addition, PRS configurations of the neighboring cells 141-143 are configured in a way that the PRS positioning occasions of the neighboring cells 141-143 are aligned in time (transmitted during a same sub-frame). In this case, one measurement gap 322 can be used to perform the RSTD measurement towards PRSs from the three neighboring cells 141-143. In one example, a time length of the measurement gap 322 can be determined based on duration of the to-be-measured PRS positioning occasions in addition to time used for switching between different carrier frequencies.

In another example, PRS positioning occasions of the neighboring cells 141-143 can take place at different times, for example, due to PRS configurations or asynchronization among the neighboring cells 141-143. Or, the neighboring cells 141-143 can operate on different carrier frequencies which may require RSTD measurement be performed separately on different carrier frequencies. Accordingly, multiple measure gaps can be configured for the RSTD measurement.

As shown, the process 300 includes multiple steps 341-344. At step 341, the UE 170 sends a first gap request (also referred to as a decoding request) for a first measurement gap in order to decode a MIB of the neighboring cell 141. The first gap request may not include a timing of the measurement gap. As a response to the first gap request, the measurement gap 321 or 323 can be configured by the serving cell 161 depending on whether the serving cell 161 knows the frame timings of the neighboring cell 141. At step 342, the UE 170 decodes a MIB carried on the sub-frame 302 during the measurement gap 321, or decodes a MIB carried on a sub-frame within the measurement gap 323, to obtain the SFN. At the same time, based on synchronization sequences carried on a sub-frame, frame timings of the neighboring cell 141 can be obtained before decoding the MIB. For example, the UE 170 can first read the synchronization sequences in the sub-frame 302 to obtain a timing of the sub-frame 302, and subsequently read the MIB of the sub-frame 302.

At step 343, the UE 170 sends a second gap request (also referred to as a measurement request) for a second measurement gap for RSTD measurement. Accordingly, assuming PRS positioning occasions of the neighboring cells 141-143 are time aligned and on a same carrier frequency, the measurement gap 322 can be scheduled that matches the timings of PRS positioning occasions of the neighboring cells 141-143. At step 344, PRSs from the neighboring cells 141-143 can be received and measured. Time differences of arrival of the PRSs can accordingly be obtained. In examples where assistance data includes more than three neighboring cells, the RSTD measurement may be performed only on a portion of all the listed neighboring cells. For example, the UE 170 may send a second gap request that includes measurement gaps matching PRS positioning occasions of a part of all listed neighboring cells.

Figure 4:
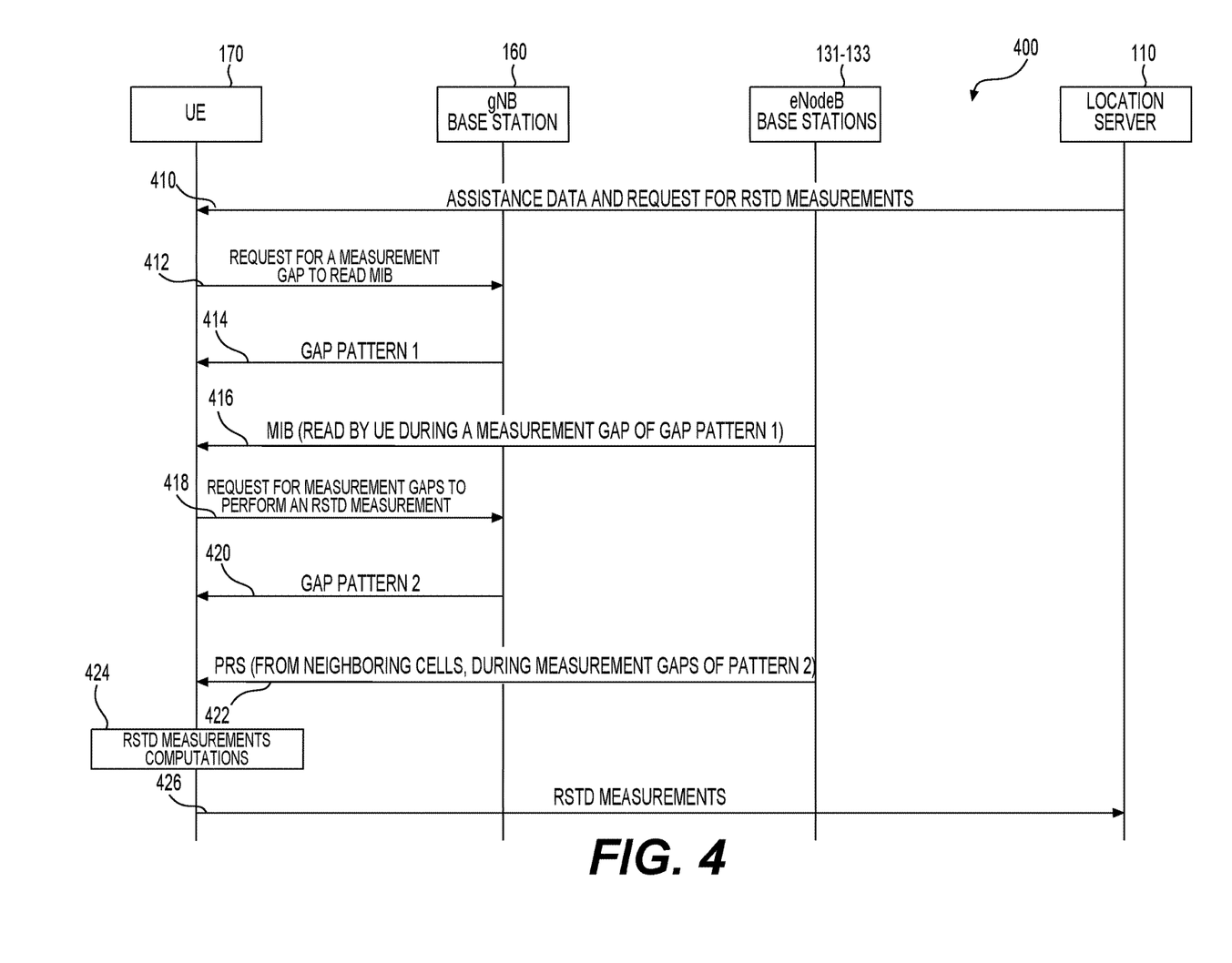
FIG. 4 shows a flowchart of an exemplary Observed Time Difference of Arrival (OTDOA) positioning process according to an embodiment of the disclosure.

FIG. 4 shows a flowchart of an exemplary OTDOA positioning process 400 according to an embodiment of the disclosure. With reference to FIG. 1, such process 400 can be performed in the wireless communication network 100 to locate the UE 170. Messages corresponding to different steps of the process 400 are shown transmitted among the UE 170, the gNB base station 160, the eNodeB base stations 131-133, and the location server 110. Particularly, during the process 400, the UE 170 requests a measurement gap from the serving cell 161 and reads a MIB of the neighboring cell 141 to obtain an SFN of the neighboring cell 141.

At step 410, assistance data and a request for RSTD measurements can be transmitted from the location server 110 to the UE 170 through the serving cell 161. In one example, LPP messages are used for the transmission of the assistance data. The assistance data can include a list of neighboring cells, for example, the neighboring cells 141-143. One of the neighboring cells 141-143 is used as a reference cell, for example, the neighboring cell 141. The assistance data can also include SFN offsets and/or frame timing offsets of the neighboring cells 142-143 with respect to the reference cell 141. The assistance data can further include PRS configurations of each neighboring cell 141-143. The assistance data can include other information useful for RSTD measurement.

At step 412, a first request for a measurement gap to read MIB can be transmitted from the UE 170 to the gNB base station 160, for example, by sending an RRC message. The request may not specify when the measurement gap is supposed to take place because the UE 170 does not have knowledge of frame timings of the neighboring cells 141-143. However, the request may specify the purpose to read a MIB, and include an identity of the reference cell 141. It is noted that obtaining an SFN of any one of the neighboring cells listed in the assistance data is sufficient to determine SFN timings and PRS positioning occasion timings of each neighboring cells. Accordingly, the request may include an identity of any one of the neighboring cells 141-143 other than the reference cell 141 in order to carry out RSTD measurement.

At step 414, a first gap pattern can be transmitted from the gNB base station 160 to the UE 170, for example, by sending an RRC message. The first gap pattern can include configuration information of a measurement gap, such as duration and starting time of the measurement gap. In a first scenario, the gNB base station 160 can have knowledge of frame timings of the reference cell 141. Accordingly, the gNB base station 160 can determine when the measurement gap for reading a MIB is to be scheduled. A measurement gap matching transmission of the MIB can be determined. In a second scenario, the gNB base station 160 may not know frame timings of the reference cell 141. Accordingly, a measurement gap with a time length larger than a MIB transmission period can be configured. The resultant measurement gap provides sufficient time for the UE 170 to decode a MIB.

At step 416, a MIB of the reference cell 141 can be read by the UE 170 during the measurement gap specified in the first gap pattern. The UE 170 decodes the MIB to obtain an SFN. At the same time, a frame timing of the reference cell 141 can be obtained according to synchronization sequences carried in a sub-frame carrying the MIB. Alternatively, frame timings of the reference cell 141 can be obtained by receiving a frame timing offset of the reference cell 141 from the gNB base station 160 when the gNB base station 160 knows the frame timings of the reference cell 141. Based on the assistance data and the above obtained frame timing and SFN, the UE 170 can determine timings of PRS positioning occasions of the neighboring cells 141-143.

At step 418, a second request for measurement gaps for RSTD measurement can be transmitted from the UE 170 to the gNB base station 160, for example, by sending an RRC message. The request may include timings of the measurement gaps that match PRS positioning occasion timings obtained at step 416. When PRS positioning occasions of the neighboring cells 141-143 are aligned in time, one measurement gap can be requested for the RSTD measurement. Alternatively, when PRS positioning occasions of the neighboring cells 141-143 occur at different times or the neighboring cells 141-143 operate on different carrier frequencies, more than one measurement gaps may be requested. In addition, in some examples, duration of the measurement gaps can be specified according to duration of respective PRS positioning occasions. At step 420, a second gap pattern can be transmitted from the gNB base station 160 to the UE 170 to inform the UE 170 that the requested measurement gaps have been scheduled. For example, an RRC message can be used for transmission of the second gap pattern. The gap pattern can be determined based on information carried in the second gap request.

At step 422, PRSs from the multiple neighboring cells 141-143 can be received and measured at the UE 170 during the measurement gap (s) of the second gap pattern. At step 424, RSTD measurements can be calculated based on measured times of arrivals of the PRSs from the neighboring cells 141-143. For example, using the reference cell 141 as a time basis, time differences of arrival of PRSs between the reference cell 141 and other neighboring cells 142-143 can be determined.

At step 426, the RSTD measurements can be transmitted from the UE 170 to the location server 110, for example, by transmitting an LPP message. The location server 110 can accordingly estimate the position of the UE 170 based on the RSTD measurements. In alternative examples, the RSTD measurements may not be transmitted to the location server 110. Instead, the UE 170 itself can use the RSTD measurements to determine a location of the UE 170 with base station location information included in the assistance data.

Figure 5:
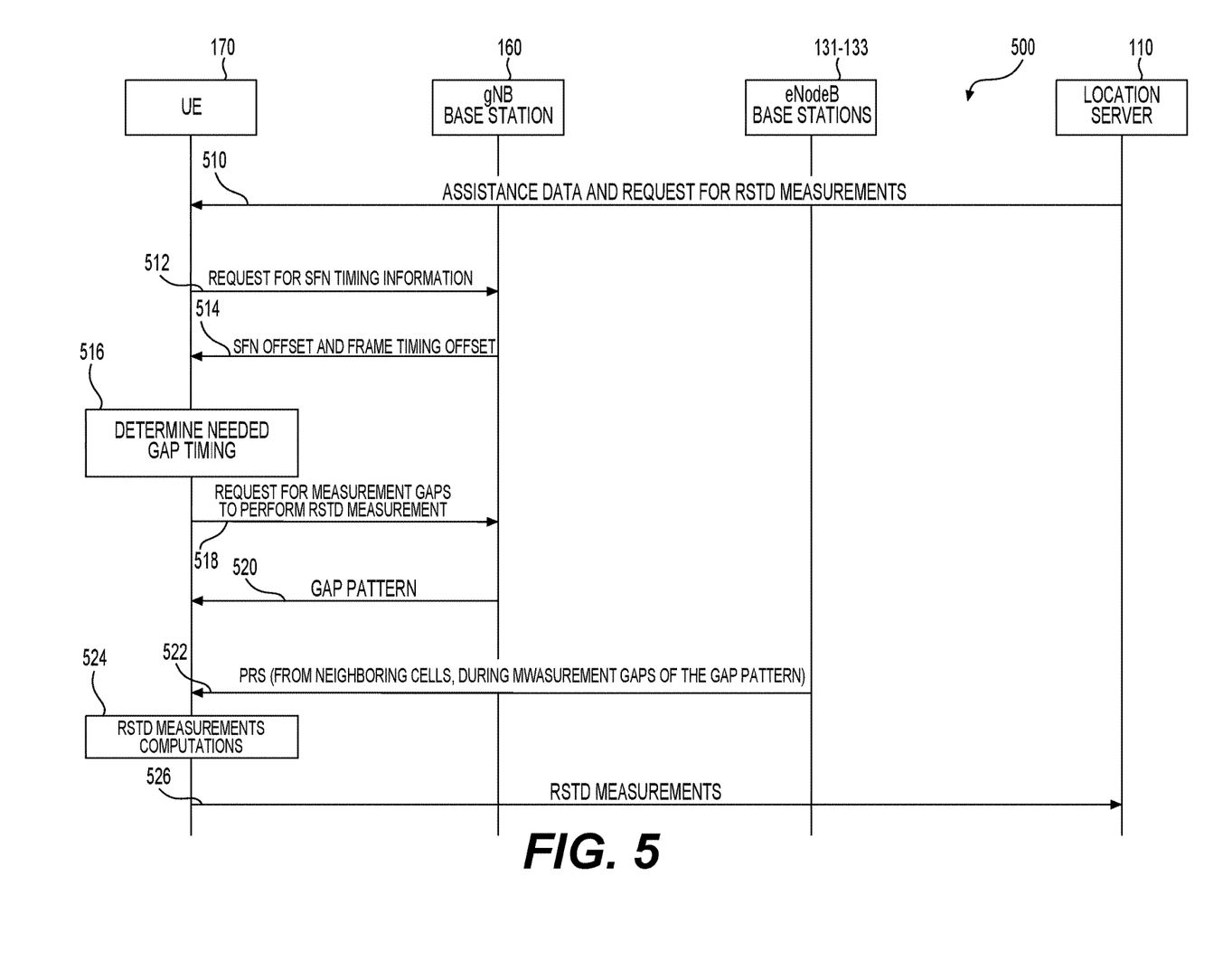
FIG. 5 shows a flowchart of another exemplary OTDOA positioning process according to an embodiment of the disclosure.

FIG. 5 shows a flowchart of another exemplary OTDOA positioning process 500 according to an embodiment of the disclosure. With reference to FIG. 1, such process 500 can be performed in the wireless communication network 100 to locate the UE 170. Similarly, messages corresponding to different steps of the process 500 are shown transmitted among the UE 170, the gNB base station 160, the eNodeB base stations 131-133, and the location server 110. Different from the process 400, during the process 500, the UE 170 can request SFN timing information of a neighboring cell listed in the assistance data from the serving cell 161.

The process 500 includes steps that are similar to that of the process 400. For example, steps 510, 518-526 are similar to the steps of 410, 418-426. However, steps 512-516 are different from the steps 412-416. Description of steps 510, 518-526 is omitted while steps 512-516 are described below.

At step 512, a request for SFN timing information of a neighboring cell 141-143 can be transmitted from the UE 170 to the serving cell 161, for example, by sending an RRC message. For example, assistance data received at step 510 can include a list of neighboring cells, for example, the neighboring cells 141-143, that are to be measured. The neighboring cell 141 can be used as a reference cell, and frame timing offsets and SFN offsets of other neighboring cells 141-143 can be specified in the assistance data with respect to the reference cell 141. Accordingly, the request can include an identity of the reference cell 141.

At step 514, SFN timing information can be transmitted from the serving cell 161 to the UE 170 as a response to the request at step 512. For example, the gNB base station 160 can have knowledge of SFN timings of the neighboring cells 141-143 due to configuration of the NR network 102. In one example, the SFN timing information includes a frame timing offset and an SFN offset of the reference cell 141 with respect to frame timing and SFN of the serving cell 161. In one example, the SFN timing information is carried in an RRC message specific to transmission of the SFN timing information. In another example, a neighboring cell list as on-demand system information can be transmitted to the UE 170. SFN timings of the neighboring cells 141-143 can be included in entries of the neighboring cell list.

In one example, an SFN of the NR network 102 has a length that is longer than an SFN of the LTE network 101. For example, an NR SFN may have a length of 12 bits while an LTE SFN may have a length of 10 bits. Accordingly, an SFN offset between the LTE SFN and the NR SFN can be defined modulo 1024 (with respect to a modulus of 1024). For example, an SFN offset between the LTE network 101 and the NR network 102 can be calculated using the following expression, SFN offset=(LTE SFN−NR SFN)mod 1024, where LTE SFN and NR SFN correspond to SFNs of an NR LTE frame and an LTE frame under comparison.

At step 516, gap timings needed for RSTD measurement are determined at the UE 170. For example, based on the assistance data and the received SFN timing information of the reference cells 141-143, timings of PRS positioning occasions of the neighboring cells 141-143 can be determined. Accordingly, timings of measurement gaps can be determined. Depending on whether the PRS positioning occasions of the neighboring cells 141-143 are aligned in time, or whether the neighboring cells 141-143 operates on different carrier frequencies, one or more measurement gaps can be scheduled. A request for a measurement gap including timings of at least one gap can subsequently be transmitted.

Figure 6:
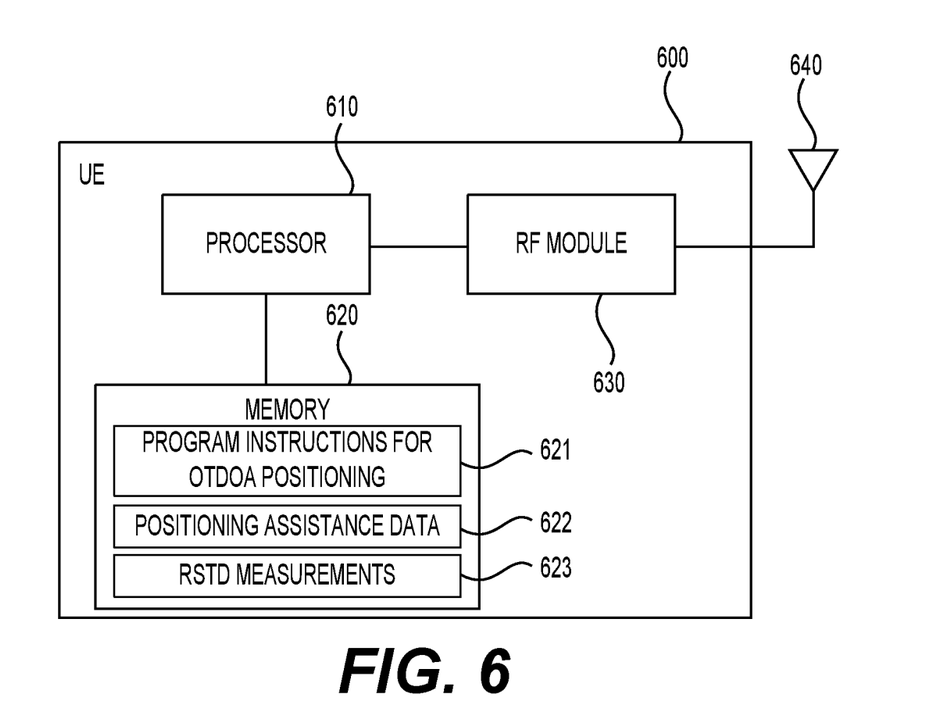
FIG. 6 shows an exemplary block diagram of user equipment (UE) according to an embodiment of the disclosure.

FIG. 6 shows an exemplary block diagram of a UE 600 according to an embodiment of the disclosure. The UE 600 can be configured to implement various embodiments of the disclosure described herein. The UE 600 can include a processor 610, a memory 620, and a radio frequency (RF) module 630 that are coupled together as shown in FIG. 6. In different examples, the UE 600 can be a mobile phone, a tablet computer, a desktop computer, a vehicle carried device, and the like.

The processor 610 can be configured to perform various functions of the UE 170 described above with reference to FIGS. 1-5. For example, the processor 610 can be configured to receive assistance data from a location server, and accordingly perform RSTD measurement and report RSTD measurements to the location server. Particularly, the processor 610 can be configured to request a measurement gap from a serving cell of the UE 600 and conduct a MIB decoding process to obtain SFN of a reference cell included in a list of neighboring cells in the assistance data. Alternatively, the processor 610 can be configured to request SFN timing information of the reference cell. Further, the processor 610 can be configured to subsequently determine PRS positioning occasions of the neighboring cells, and accordingly request a set of measurement gaps to perform the RSTD measurement towards the PRSs from the neighboring cells.

The UE 600 can operate on different types of wireless networks, such as an LTE network, a 5G NR network, and the like. Accordingly, the processor 610 can include signal processing circuitry to process received or to be transmitted data according to communication protocols corresponding to different types of wireless networks. Additionally, the processor 610 may execute program instructions, for example, stored in the memory 620, to perform functions related with different communication protocols. The processor 610 can be implemented with suitable hardware, software, or a combination thereof. For example, the processor 610 can be implemented with application specific integrated circuits (ASIC), field programmable gate arrays (FPGA), and the like, that includes circuitry. The circuitry can be configured to perform various functions of the processor 610.

In one example, the memory 620 can store program instructions that, when executed by the processor 610, cause the processor 610 to perform various functions as described herein. For example, the memory 620 can store program instructions 621 for performing an OTDOA positioning process as described in this disclosure. In addition, the memory 620 can store data related with the OTDOA positioning process, such as positioning assistance data 622, RSTD measurements 623, and the like. The memory 620 can include a read only memory (ROM), a random access memory (RAM), a flash memory, a solid state memory, a hard disk drive, and the like.

The RF module 630 can be configured to receive a digital signal from the processor 610 and accordingly transmit a signal to a base station in a wireless communication network via an antenna 640. In addition, the RF module 630 can be configured to receive a wireless signal from a base station and accordingly generate a digital signal which is provided to the processor 610. The RF module 630 can include digital to analog/analog to digital converters (DAC/ADC), frequency down/up converters, filters, and amplifiers for reception and transmission operations. Particularly, the RF module 630 can include signal processing circuits to support the UE 170 to operate on different types of wireless communication networks, such as a LTE network, a 5G NR network, and the like. For example, the RF module 630 can include converter circuits, filter circuits, amplification circuits, and the like, for processing signals on different carrier frequencies.

The UE 600 can optionally include other components, such as input and output devices, additional CPU or signal processing circuitry, and the like. Accordingly, the UE 600 may be capable of performing other additional functions, such as executing application programs, and processing alternative communication protocols.

Figure 7:
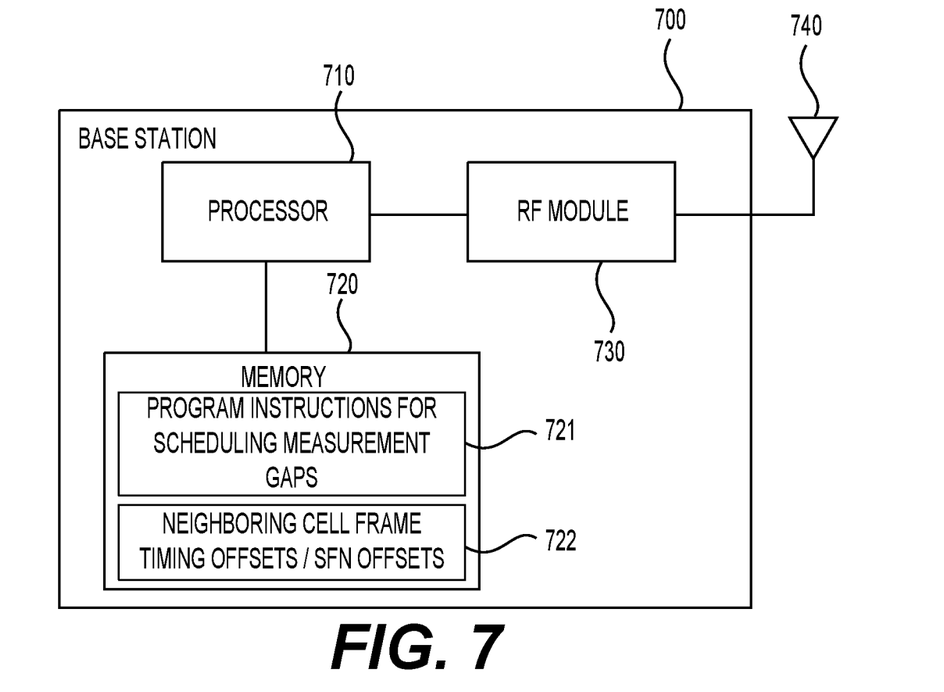
FIG. 7 shows an exemplary block diagram of a base station according to an embodiment of the disclosure.

FIG. 7 shows an exemplary block diagram of a base station 700 according to an embodiment of the disclosure. The base station 700 can be configured to implement various embodiments of the disclosure described herein. Similarly, the base station 700 can include a processor 710, a memory 720, and a radio frequency (RF) module 730. Those components are coupled together as shown in FIG. 7. In different examples, the base station can be an eNodeB in an LTE network, a gNB in an NR network, and the like.

The processor 710 can be configured to perform various functions of the gNB base station 160 described with reference to FIGS. 1-5. For example, the processor 710 can be configured to schedule a measurement gap for a UE to decode MIB of a reference cell to obtain SFN of the reference cell during an OTDOA positioning process. When the base station 700 is configured with frame timings of the reference cell, the measurement gap can be configured in a way that the measurement gap matches a MIB transmission of the reference cell. When the base station 700 does not know frame timings of the reference cell, a measurement gap having a time length longer than a MIB transmission period of the reference cell can be configured. Alternatively, the processor 710 can be configured to provide an SFN offset and frame timing offset to the UE as a response to a request from the UE.

The processor 710 can include signal processing circuits for signal processing according to various communication protocols, such as protocols specified in the 3GPP LTE or 5G NR standards. The processor 710 can also be configured to execute program instructions to carry out various functions according to the various communication protocols. The processor 710 can be implemented with hardware, software, or a combination thereof. For example, the processor 710 can be implemented with application specific integrated circuits (ASIC), field programmable gate arrays (FPGA), and the like, that includes circuitry. The circuitry can be configured to perform various functions of the processor 710.

In one example, the memory 720 can store program instructions that, when executed by the processor 710, cause the processor 710 to perform various functions described herein. For example, the memory 720 can store program instructions 721 for scheduling measurement gaps as described in this disclosure. In addition, the memory 720 can store data related with an OTDOA positioning process, such as neighboring cell frame timing offsets and/or SFN offsets 722 depending on configuration of the base station 700. Similarly, the memory 720 can include a read only memory (ROM), a random access memory (RAM), a flash memory, a solid state memory, a hard disk drive, and the like.

The RF module 730 can have functions and structure similar to that of the RF module 630. However, the RF module 730 can have functions and structures more suitable for performance of the base station 700. For example, the RF module 730 can have a higher transmission power for coverage of a large serving area and multiple UE users, or support more downlink or uplink component carriers. The RF module 730 can receive or transmit wireless signals via an antenna 740.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for observed time difference of arrival (OTDOA) positioning, comprising:
    receiving, by a user equipment (UE) operating in a radio resource control (RRC) connected state with a new radio (NR) serving cell, an RRC message from the NR serving cell, the RRC message indicating a system frame number (SFN) offset between the NR serving cell and a long-term evolution (LTE) reference cell to be used in the OTDOA positioning, and the RRC message further indicating a frame timing offset, the frame timing offset indicating that the NR serving cell lacks frame boundary synchronization with the LTE reference cell, wherein the frame timing offset corresponds to an offset between the NR serving cell and the LTE reference cell;

receiving, by the UE, information indicating one or more measurement gaps from the NR serving cell; and using, by the UE, the one or more measurement gaps for measuring time differences between the LTE reference cell and neighboring cells based on positioning reference signals (PRSs) of the LTE reference cell and PRSs of the neighboring cells, the PRSs of the LTE reference cell and the PRSs of the neighboring cells determined based on the SFN offset and the frame timing offset, wherein the OTDOA positioning is determined based on the time differences.

2. The method of claim 1, wherein the RRC message further includes a cell identity of the LTE reference cell.

3. The method of claim 1, wherein the RRC message further includes PRS configuration information of the neighboring cells.

4. The method of claim 1, wherein the RRC message further includes an SFN offset of the LTE reference cell.

5. The method of claim 1, further comprising:
determining, by the UE, timings of the PRSs of the neighboring cells based on the SFN offset of the LTE reference cell and assistance data carried by the RRC message.

6. The method of claim 1, wherein the NR serving cell and the LTE reference cell are located in different networks.

7. A user equipment (UE) comprising:
at least one processor; and
a non-transitory computer readable storage medium operably connected to the at least one processor,
the non-transitory computer readable storage medium storing programming, the programming including instructions, that when executed by the at least one processor, to cause the UE to:
receive, while operating in a radio resource control (RRC) connected state with a new radio (NR) serving cell, an RRC message from the NR serving cell, the RRC message indicating a system frame number (SFN) offset between the NR serving cell and a long-term evolution (LTE) reference cell to be used in observed time difference of arrival (OTDOA) positioning, and the RRC message further indicating a frame timing offset, the frame timing offset indicating that the NR serving cell lacks frame boundary synchronization with the LTE reference cell, wherein the frame timing offset corresponds to an offset between the NR serving cell and the LTE reference cell;
receive information indicating one or more measurement gaps from the NR serving cell; and
use the one or more measurement gaps for measuring time differences between the LTE reference cell and neighboring cells based on positioning reference signals (PRSs) of the LTE reference cell and PRSs of the neighboring cells, the PRSs of the LTE reference cell and the PRSs of the neighboring cells determined based on the SFN offset and the frame timing offset,
wherein the OTDOA positioning is determined based on the time differences.

8. The UE of claim 7, wherein the RRC message further includes a cell identity of the LTE reference cell.

9. The UE of claim 7, wherein the RRC message further includes PRS configuration information of the neighboring cells.

10. The UE of claim 7, wherein the RRC message further includes an SFN offset of the LTE reference cell.

11. The UE of claim 7, wherein the programming further includes instructions, that when executed by the at least one processor, to cause the UE to:
determine timings of the PRSs of the neighboring cells based on the SFN offset of the LTE reference cell and assistance data carried by the RRC message.

12. A method for observed time difference of arrival (OTDOA) positioning, comprising:
transmitting, by a new radio (NR) serving cell, a radio resource control (RRC) message to a user equipment (UE) operating in an RRC connected state with the NR serving cell, the RRC message indicating a system frame number (SFN) offset between the NR serving cell and a long-term evolution (LTE) reference cell to be used in the OTDOA positioning, and the RRC message further indicating a frame timing offset, the frame timing offset indicating that the NR serving cell lacks frame boundary synchronization with the LTE reference cell, wherein the frame timing offset corresponds to an offset between the NR serving cell and the LTE reference cell; and
transmitting, by the NR serving cell to the UE, information indicating one or more measurement gaps for measuring time differences between the LTE reference cell and neighboring cells based on positioning reference signals (PRSs) of the LTE reference cell and PRSs of the neighboring cells, the PRSs of the LTE reference cell and the PRSs of the neighboring cells determined based on the SFN offset and the frame timing offset,
wherein the OTDOA positioning is determined based on the time differences.

13. The method of claim 12, wherein the RRC message further includes a cell identity of the LTE reference cell.

14. The method of claim 12, wherein the RRC message further includes PRS configuration information of the neighboring cells.

15. The method of claim 12, wherein the RRC message further includes an SFN offset of the LTE reference cell.

16. The method of claim 12, wherein the NR serving cell and the LTE reference cell are located in different networks.

17. The method of claim 1, wherein the neighboring cells are LTE neighboring cells.

18. The method of claim 1, wherein the RRC message further includes cell identities of the neighboring cells.

19. The UE of claim 7, wherein the neighboring cells are LTE neighboring cells, and wherein the frame timing offset corresponds to a time a frame is transmitted.

20. The UE of claim 7, wherein the RRC message further includes cell identities of the neighboring cells.

21. The method of claim 12, wherein the neighboring cells are LTE neighboring cells, and wherein the frame timing offset corresponds to a time a frame is transmitted.

22. The method of claim 12, wherein the RRC message further includes cell identities of the neighboring cells.

* * * * *